Oct. 7, 1941.  E. F. KING  2,258,017
WASTE CONNECTION
Filed April 23, 1940
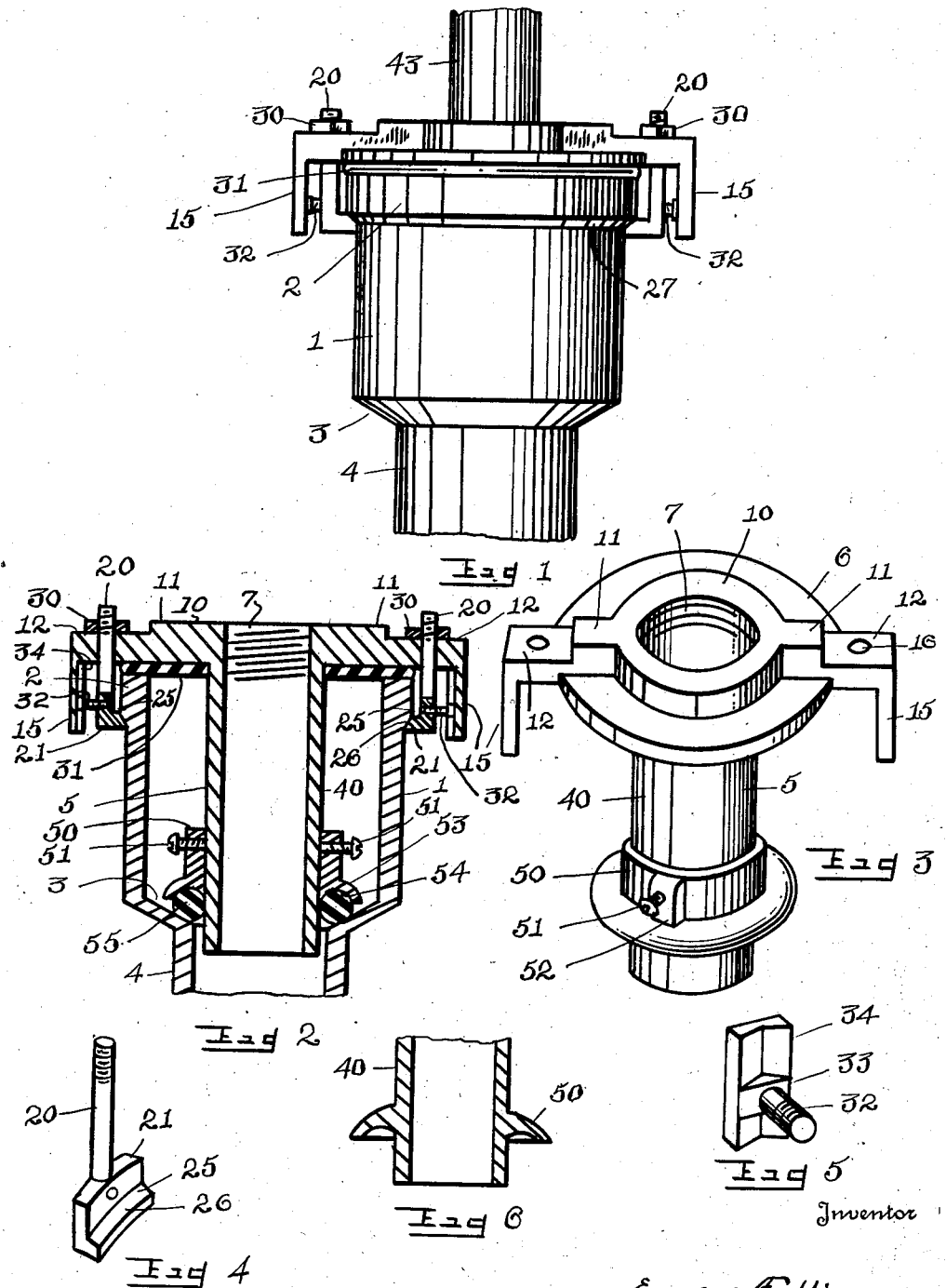
Inventor
Eugene F. King
By Thomas L. Wilder
Attorney Patented Oct. 7, 1941

2,258,017

UNITED STATES PATENT OFFICE 2,258,017

WASTE CONNECTION

Eugene F. King, Utica, N. Y.

Application April 23, 1940, Serial No. 331,192

5 Claims. (Cl. 285—22)

My invention relates to a waste connection and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a member by which the waste pipe can be connected to the soil line in the ordinary building in a perfect fiting manner by the unskilled person as well as the skilled. That is, the joint is fool proof.

The said waste connection is adapted to eliminate the necessity of wiping a joint or corking the connection to the soil hub by the plumber when making the connection of the waste pipe to soil line. Thus the owner of the building can do his own plumbing so far as the waste line and soil line pipes are concerned.

Heretofore the stoppage in the waste line usually occurred at the connection of the waste line with the soil line or hub of the soil pipe. With the present invention this stoppage can be easily and quickly remedied by the owner of the building without the aid of a plumber or skilled mechanic by merely loosening certain bolts employed in the connection and separating waste line pipe from the hub of the soil pipe and then reassembling the parts, which are so made that they are bound to fit together perfectly no matter who does the work.

Thus the connection may serve as a cleanout of the waste and soil lines when said lines are stopped by lint or other foreign matter.

The object will be understood by referring to the drawing in which,

Fig. 1 is an elevational view of the device.

Fig. 2 is a central vertical section.

Fig. 3 is a detail enlarged view showing a perspective of a tunnel member employed.

Fig. 4 is a detail enlarged view showing a headed bolt employed.

Fig. 5 is a detail enlarged view of another head bolt employed showing its relation to one of its cooperating parts.

Fig. 6 is a detail enlarged view showing a modified form of the tunnel member employed, parts broken away.

Referring more particularly to the drawing the device embodies a hub member 1 having a flange 2 on its upper rim. The lower portion of hub 1 is formed with a conical surface at 3, whereby to converge towards the diminished diameter portion 4 or soil pipe line of hub 1.

There is disposed within hub 1 tunnel member 5 which has at its top portion a disc or flange 6 formed integral therewith. An annular boss 10 upstanding on flange 6 is made integral therewith, whereby to provide a surface for internal threads 7 hereinafter mentioned. At diametrical opposite positions on boss 10 are formed ridges 11, 11 having reduced portions at 12, 12. Depending members 15, 15 are made integral with the ends of portions 12, 12. Apertures 16, 16 are made in said portions 12, 12 for the projection of bolts 20, 20 having heads 21, 21. Each of said heads 21 is arc shaped, whereby to conform to the curvature of the outer surface of hub 2 against which they fit. Furthermore each of said heads 21 is equipped with a shoulder 25 and beveled surface at 26, whereby to conform to the beveled or conical surface 27 of hub 1. Nuts 30, 30 are screw mounted to the upper ends of bolts 20, 20, whereby to draw said hub 1 and flange 6 towards each other in a hermetically sealed manner when said parts are assembled.

Annular washer 31 is disposed between the under surface of flange 6 and the upper surface of hub 1, whereby to aid in sealing the connection between said parts.

The means for holding heads 21, 21 against the beveled conical surface 27 of hub 1 embodies adjustable screw bolts 32, 32. Each of said bolts 32 is mounted in a transverse threaded aperture made in bolt 20. The head 33 of each of said bolts 32 abuts against the inner surface of depending member 15, whereby to hold said bolt 20 with its head 21 firmly against the beveled surface 27 of hub 1. Turning bolt 32 to the right or left on bolt 20 will take up any slack between the surface of bolt 32 and the contiguous surface of depending member 15. The head 33 of each of the bolts 32 is wedge shaped to fit into a corresponding V shaped groove 34 made on the inner surface of depending member 15, whereby to prevent said bolt 32 from turning when set for loosening or changing from its adjusted position. V shaped groove 34 need not be made deep but a rather shallow groove will answer the purpose just as well.

The central portion 40 of tunnel 5 is of tubular formation. A waste line pipe 43 having external threads is screw mounted to said threads 7 of boss 10. Said tube 40 projects down through hub 1 at least below conical surface 3 of hub 1 to eliminate the possibility of exposing a portion of said conical surface 3, which exposed surface would form an obstruction against which grease, lint and other foreign matter might tend to catch and accumulate and finally effect a stoppage of the waste line.

The means for sealing the outer surface of the lower end of tube 40 of tunnel member 5 with the lower portions of hub 1 contemplates an adjustable collar 50 held in predetermined position to tube 40 by set screw bolts 51, 51 threaded to enlargements 52, 52 made integral with collar 50 and at diametrical opposite positions on collar 50. The lower surface of collar 50 is enlarged at 53. The under surface of enlarged part 53 is concaved at 54, whereby to fit over the annular washer or gasket 55. The under surface of gasket 55 rests against the conical surface 3 of hub 1 and is pressed closely thereagainst, whereby to form a hermetically sealed joint between outer surface of tube 40 of tunnel member 5 and the inner conical surface 3 of hub 1.

In operation the user will first adjust collar 50 on tubular part 40 of tunnel member 5, whereby washer 55 will effect a hermetically sealed joint with conical part 3 of hub 1 when the parts are assembled. He will adjust also screw bolts 32, 32 in bolts 20, 20, whereby to hold heads 21, 21 of said bolts 20, 20 against the annular external beveled part 27 of hub 1. Washer 31 will be placed on the upper surface of flange 2 of hub 1, the tunnel 40 of part 5 will then be inserted in hub 1 with tubular portion 40 extending below conical surface 3 thereof. Bolts 20, 20 will be projected up through apertures 16, 16 in parts 12, 12 of disc or flange 6 and nuts 30, 30 tightening on bolts 20, 20, whereby to draw shoulders 25 of heads 21 upward against the beveled surface 27 of hub 1. This will draw hub 1 and tunnel member 5 tightly together with washer 31 in between and washer 55 sealed against the contiguous conical surface 3 of hub 1.

It will be observed that in the use of the tunnel member 5 with the hub member 1, that a perfect fitting joint is effected no matter at what angle the waste pipe 43 approaches the hub 1 and no matter who does the work, that is, the joint is foolproof, whereas heretofore such a joint through carelessness of the workman or otherwise was not centered to hub 1. This resulted in exposing a portion of the conical part 3 of hub 1, whereby lint, matches and grease would catch and accumulate and finally effect a complete stoppage of the waste line.

Fig. 6 shows a modified form of tubular member 5, wherein collar 50 is made integral with tubular portion 40 and not separate as above described.

Having thus described my invention what I claim as new and desire to secure by Letters Patent is as follows:

1. In a waste connection, a hub having a conical surface connected with an outlet directly therebelow, a tunnel member disposed within said hub and extending below said conical surface, a flange member formed on said tunnel member, bolts connecting said flange member with said hub, a collar attached to said tunnel member, a washer disposed between said collar member and said conical surface for sealing the connection between the tunnel member and said hub to form a hermetically sealed joint.

2. In a waste connection, a hub member having a conical surface, a tunnel member mounted within said hub member and extending below said conical surface, said tunnel member having depending members with V shaped grooves for holding said second named member to said hub member and other bolts having wedge shaped heads cooperating with said V shaped grooves mounted in said first bolts, whereby to hold said first named bolts in predetermined position and a gasket for sealing the connection between said hub member and said tunnel member.

3. In a waste connection, a hub member having an interior conical surface, a tunnel member mounted within said hub member and extending below said conical surface, said tunnel member having depending members with V shaped grooves therein, bolts for holding said tunnel member to said hub member, other bolts having wedge shaped heads cooperating with said V shaped grooves for holding said first named bolts against said hub member, an adjustable collar attached to said tunnel member, a washer disposed between said collar member and said conical surface of said hub member and another washer disposed between said tunnel member and said hub member, whereby to effect a hermetically sealed joint.

4. In a waste connection, a hub having a conical surface, a tunnel member disposed within said hub and extending below said conical surface, a flange member formed on said tunnel member, bolts connecting said flange member with said hub and other bolts cooperating with said first named bolts, whereby to hold said first named bolts in predetermined position.

5. In a waste connection, a hub member having an interior conical surface, a tunnel member mounted within said hub member and extending below said conical surface, said tunnel member having depending members, bolts for holding said tunnel member to said hub member, other bolts mounted in said first named bolts and engaging said depending members, whereby to hold said first named bolts against said hub member and an adjustable collar attached to said tunnel member, a washer disposed between said collar member and said conical surface of said hub member and another washer disposed between said tunnel member and said hub member, whereby to effect a hermetically sealed joint.

EUGENE F. KING.